(12) United States Patent
Bhardwaj et al.

(10) Patent No.: US 11,754,687 B1
(45) Date of Patent: Sep. 12, 2023

(54) LIGHT DETECTION AND RANGING (LIDAR) SYSTEM INCLUDING A MODULAR ASSEMBLY

(71) Applicant: Aurora Operations, Inc., Mountain View, CA (US)

(72) Inventors: Ashish Bhardwaj, Mountain View, CA (US); Colin Delaney, Bozeman, MT (US); Stefan Heinemann, Bozeman, MT (US); Amir Hosseini, San Jose, CA (US); Pruthvi Jujjavarapu, Palo Alto, CA (US); Parth Panchai, Englewood, CO (US); Zhizhong Tang, Palo Alto, CA (US)

(73) Assignee: AURORA OPERATIONS, INC., Mountain View, CA (US)

( * ) Notice: Subject to any disclaimer, the term of this patent is extended or adjusted under 35 U.S.C. 154(b) by 0 days.

(21) Appl. No.: 18/148,897

(22) Filed: Dec. 30, 2022

(51) Int. Cl.
*G01C 3/08* (2006.01)
*G01S 7/4911* (2020.01)
*G01S 7/481* (2006.01)
*G01S 7/4912* (2020.01)

(52) U.S. Cl.
CPC .......... *G01S 7/4911* (2013.01); *G01S 7/4814* (2013.01); *G01S 7/4917* (2013.01)

(58) Field of Classification Search
None
See application file for complete search history.

(56) References Cited

U.S. PATENT DOCUMENTS

| | | | |
|---|---|---|---|
| 2021/0382142 A1* | 12/2021 | Rogers | G01S 17/89 |
| 2022/0206127 A1* | 6/2022 | Li | G01S 7/4814 |
| 2022/0334231 A1* | 10/2022 | Shah | G01S 7/4863 |

FOREIGN PATENT DOCUMENTS

| | | | | |
|---|---|---|---|---|
| JP | H11326707 A | * | 5/1998 | G02B 6/42 |
| JP | 2004235182 A | * | 8/2004 | H01S 5/187 |
| KR | 102365128 B1 | * | 2/2022 | G01S 7/4818 |

* cited by examiner

*Primary Examiner* — Mark Hellner
(74) *Attorney, Agent, or Firm* — PATENT LAW WORKS LLP

(57) ABSTRACT

A modular LIDAR system comprising a seed laser configured to output a beam, a modular modulator coupled to receive the beam output the seed laser and modulate the beam to create a modulated beam, a modular amplifier coupled to receive the modulated beam from the modular modulator and generate an amplified beam, and a modular transceiver chip coupled to the modular modulator and the modular amplifier, the transceiver chip configured to emit the beam perpendicularly from a first surface of the transceiver chip through an optical window; and receive a reflected beam from a target through the optical window.

20 Claims, 10 Drawing Sheets

FIG. 5

| Micro-lens 502a | Splitter 504a | Micro-lens Array 506a | TSOA 508a | Micro-lens Array 510a | |
|---|---|---|---|---|---|
| Modular Modulator 306 | Micro-lens 502b | Splitter 504b | Micro-lens Array 506b | TSOA 508b | Micro-lens Array 510b |
| Seed Laser 308 | Micro-lens 502c | Splitter 504c | Micro-lens Array 506c | TSOA 508c | Micro-lens Array 510c |
| | Micro-lens 502d | Splitter 504c | Micro-lens Array 506d | TSOA 508d | Micro-lens Array 510d |
| | | | Modular SiPho Transceiver Chip 302 | | |

500

LIGHT DETECTION AND RANGING (LIDAR) SYSTEM INCLUDING A MODULAR ASSEMBLY

TECHNICAL FIELD

The present disclosure pertains generally to a modular assembly of components for a light detection and ranging (LIDAR) system, and more specifically to a LIDAR system comprising a modular modulator, a modular amplifier, and a modular transceiver chip.

BACKGROUND

LIDAR sensor systems are used for a variety of applications, from altimetry, to imaging, to collision avoidance. The design and implementation of a LIDAR sensor system may use a photonic integrated circuit (PIC) or integrated optical circuit which is a chip that contains photonic components. There have been attempts in the past to include more and more photonic components of the LIDAR system onto a single PIC. However, the problem with these attempts is that they are complex and significantly reduced yield in producing such complex chips. Other prior art approaches have used fiber optic connectors to couple different components of the LIDAR system. The problem with using fiber optic cable connectors, besides the additional space required, is the configuration complexity and alignment issues that come into play using fiber and connectors. Thus, there is a need for a way to build a LIDAR system that has high yield and reduced complexity.

SUMMARY

Implementations of the present disclosure relate to a modular architecture for a light detection and ranging (LIDAR) system, and more particularly to a LIDAR system comprised of modular components and methods for configuring the components for cooperation and communication. According to one aspect of the subject matter described in this disclosure includes a LIDAR system comprising a seed laser configured to output a beam, a modular modulator coupled to receive the beam output the seed laser and modulate the beam to create a modulated beam, a modular amplifier coupled to receive the modulated beam from the modular modulator and generate an amplified beam, and a modular transceiver chip coupled to the modular modulator and the modular amplifier, the transceiver chip configured to emit the beam perpendicularly from a first surface of the transceiver chip through an optical window; and receive a reflected beam from a target through the optical window.

These and other implementations may each optionally include one or more of the following features. For instance, the features may include the seed laser comprising a distributed feedback laser or comprising a micro-lens coupling the beam to the modular modulator. For example, features may also include that the modular modulator performs in-phase and quadrature modulation or phase modulation to generate the modulated beam. In another example, the features may include the modular modulator and the seed laser are integrated into a single chip to form a seed laser assembly. In another feature, the seed laser assembly is mounted on the first submount and the modular transceiver chip coupled is mounted on a second submount for aligning a height of the seed laser assembly and a height of the modular transceiver chip for optical coupling. In some features, the modular amplifier comprises a semiconductor optical amplifier or a tapered semiconductor optical amplifier. For instance, in one aspect, the modular amplifier is constructed of indium phosphide (InP), gallium arsenide (GaAs), Silicon Nitride (SiN), indium monoarsenide (InAs), gallium and nitride (GaN), or indium antimonide (InSb). The features may also include the modular amplifier comprises at least one semiconductor optical amplifier with multiple apertures and the at least one semiconductor optical amplifier has additional material on its sides for bow management. Further, the features may also include that the modular amplifier comprises a first bar mounted on the top of the modular amplifier and a second bar mounted on the bottom of the modular amplifier for matching a coefficient of thermal expansion, the first bar and the second bar coupled cooled to lower a junction temperature of the modular amplifier, or further that the first bar and the second bar are 16 aperture bars and the modular amplifier includes 16 tapered semiconductor optical amplifiers. For instance, the features may include the modular modulator optically coupled to the modular amplifier by a micro-lens array or that the micro-lens lens array compensates for a height difference in a first height of a submount of the modular modulator and a second height of a submount of the modular amplifier. The features may also include the modular modulator, the modular amplifier and the modular transceiver chip are fully tested prior to integration enabling high yield. Other features may include that a splitter couples the modular modulator to the modular amplifier, and the splitter is a 1-to-16 splitter with a pitch in a range of 450 to 550 micrometers. For example, the features may include a splitter and a micro-lens array couples the modular modulator to the modular amplifier, and the splitter is a plurality of a 1-to-4 splitter chips with a pitch in a range of 450 to 550 micrometers, and the micro-lens array is a plurality of micro-lens arrays with four lenses and having a pitch in a range of 450 to 550 micrometers. Additionally, the features may include the modular modulator, the modular amplifier and the modular transceiver chip are horizontally integrated or vertically integrated.

Those skilled in the art will appreciate that the summary is illustrative only and is not intended to be in any way limiting. Any of the features described herein may be used with any other features, and any subset of such features can be used in combination according to various implementations. Other aspects, inventive features, and advantages of the devices and/or processes described herein, as defined solely by the claims, will become apparent in the detailed description set forth herein and taken in conjunction with the accompanying drawings. Moreover, the language used in the present disclosure has been principally selected for readability and instructional purposes, and not to limit the scope of the subject matter disclosed herein.

BRIEF DESCRIPTION OF THE DRAWINGS

Implementations are illustrated by way of example, and not by way of limitation, in the figures of the accompanying drawings in which like reference numerals refer to similar elements and in which:

FIG. 5 is a high-level block diagram illustrating example modular components for a LIDAR system with horizontal or vertical integration for autonomous vehicles, according to some implementations.

Figure 1A:
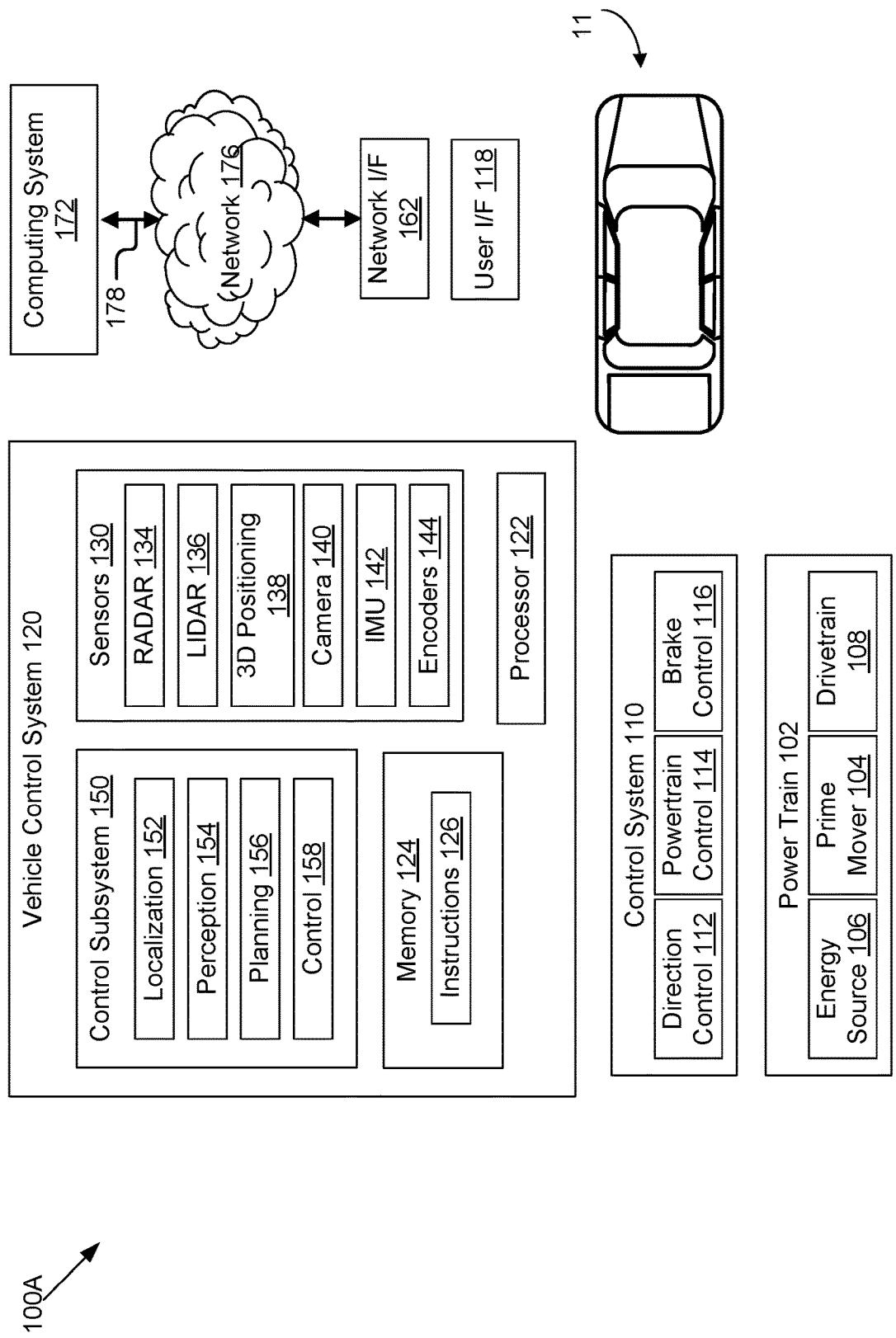
FIG. 1A is a block diagram illustrating an example of a system environment for an autonomous vehicle according to some implementations.

It should be understood that alternative implementations of the structures and methods illustrated herein may be employed without departing from the principles described herein.

DETAILED DESCRIPTION

According to certain aspects, a modular LIDAR system 300 comprises a seed laser 308, a modular modulator 306, a modular amplifier 304 and a modular transceiver chip 302. The LIDAR system 300 is advantageous because each of these components 302, 304, 306, and 308 has a modular design. This modular design is particularly advantageous because each of the components is a discrete integrated circuit, and the discrete integrated circuits are optically coupled by micro-lenses. Because of this modularity, the modular LIDAR system 300 overcomes the shortcomings of the prior art noted above because each of the discrete integrated circuits has a much higher yield for each of the modular components. This modular design allows each component to be tested individually for its efficacy in a variety of aspects. Further, this modular design also provides more configuration flexibility because different versions of any of the modular modulator 306, modular amplifier 304 or the modular transceiver chip 302 can be used in combination with the other modular components. In some implementations, the LIDAR system 300 may also include an integrated chip packaging for the LIDAR sensor defines the configuration of optical components for providing a path for the optical signal to travel in and out of the LIDAR sensor and dissipating the heat generated by the optical components for improved performance. The modular transceiver chip 302 may be configured to emit the beam perpendicularly from a first surface of the modular transceiver chip 302 through an optical window and receive a reflected beam from a target through the optical window.

In the following description, for purposes of explanation, numerous specific details are set forth to provide a thorough understanding of the various aspects of different example implementations. Note that any particular example implementation may in various cases be practiced without all of the specific details and/or with variations, permutations, and combinations of the various features and elements described herein. Reference will now be made in detail to the implementations of the present disclosure, examples of which are illustrated in the accompanying drawings. Wherever possible, the same reference numbers are used in the drawings and the description to refer to the same or like parts.

Furthermore, relative terms, such as "lower" or "bottom" or "back" or "below" and "upper" or "top" or "front" or "above" may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The example term "lower" can, therefore, encompass both an orientation of "lower" and "upper," depending upon the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Referring to the drawings, wherein like numbers denote like parts throughout the several views, FIG. 1A illustrates an example of a system environment 100A for an autonomous vehicle 111A within which various techniques disclosed herein may be implemented. The vehicle 111A, for example, may include a powertrain 102 including a prime mover 104 powered by an energy source 106 and capable of providing power to a drivetrain 108, as well as a control system 110 including a direction control 112, a powertrain control 114, and a brake control 116. The vehicle 111A may be implemented as any number of different types of vehicles, including vehicles capable of transporting people and/or cargo, and capable of traveling by land and it should be appreciated that the aforementioned components 102-116 may vary widely based upon the type of vehicle within which these components are utilized.

For simplicity, the implementations discussed hereinafter focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels, or other renewable energy sources, and/or a fuel cell system. The drivetrain 108 includes wheels and/or tires along with a transmission and/or any other mechanical drive components suitable for converting the output of the prime mover 104 into vehicular motion, as well as one or more brakes configured to controllably stop or slow the vehicle 111A and direction or steering components suitable for controlling the trajectory of the vehicle 111A (e.g., a rack and pinion steering linkage enabling one or more wheels of the vehicle 111A to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in other implementations, multiple electric motors (e.g., dedicated to individual wheels or axles) may be used as a prime mover 104. In the case of a hydrogen fuel cell implementation, the prime mover 104 may include one or more electric motors and the energy source 106 may include a fuel cell system powered by hydrogen fuel.

The direction control 112 may include one or more actuators and/or sensors for controlling and receiving feedback from the direction or steering components to enable the vehicle 111A to follow a desired trajectory. The powertrain control 114 may be configured to control the output of the powertrain 102, e.g., to control the output power of the prime mover 104, to control a gear of a transmission in the drivetrain 108, etc., thereby controlling a speed and/or direction of the vehicle 111A. The brake control 116 may be configured to control one or more brakes that slow or stop vehicle 111A, e.g., disk or drum brakes coupled to the wheels of the vehicle.

Other vehicle types, including, but not limited to, all-terrain or tracked vehicles, and construction equipment, may utilize different powertrains, drivetrains, energy sources, direction controls, powertrain controls and brake controls. Moreover, in some implementations, some of the components can be combined, e.g., where directional control of a vehicle is primarily handled by varying an output of one or more prime movers. Therefore, implementations disclosed herein are not limited to the particular application of the herein-described techniques in an autonomous wheeled land vehicle.

In the illustrated implementation, various levels of autonomous control including full or semi-autonomous control over the vehicle 111A can be implemented in a vehicle control system 120, which may include one or more processors 122 and one or more memories 124, with each processor 122 configured to execute program code instructions 126 stored in a memory 124. The processor(s) can include, for example, graphics processing unit(s) ("GPU(s) ") and/or central processing unit(s) ("CPU(s)").

Sensors 130 may include various sensors suitable for collecting information from a vehicle's surrounding environment for use in controlling the operation of the vehicle 111A. For example, sensors 130 can include one or more detection and ranging sensors (e.g., a RADAR sensor 134, a LIDAR sensor 136, or both), a 3D positioning sensor 138, e.g., a satellite navigation system such as GPS (Global Positioning System), GLONASS (Global Naya Navigazionnaya Sputnikovaya Sistema, or Global Navigation Satellite System), BeiDou Navigation Satellite System (BDS), Galileo, Compass, etc. The 3D positioning sensors 138 can be used to determine the location of the vehicle on the Earth using satellite signals. The sensors 130 can optionally include a camera 140 and/or an IMU (inertial measurement unit) 142. The camera 140 can be a monographic or stereographic camera and can record still and/or video images. The IMU 142 can include multiple gyroscopes and accelerometers capable of detecting linear and rotational motion of the vehicle 111A in three directions. One or more encoders 144, such as wheel encoders may be used to monitor the rotation of one or more wheels of vehicle 111A. In some implementations, the LIDAR sensor 136 may include a structure of the silicon photonics device for the coherent LIDAR system as described in detail below.

The outputs of sensors 130 may be provided to a set of control subsystems 150, including, a localization subsystem 152, a perception subsystem 154, a planning subsystem 156, and a control subsystem 158. The localization subsystem 152 is principally responsible for precisely determining the location and orientation (also sometimes referred to as "pose" or "pose estimation") of the vehicle 111A within its surrounding environment, and generally within some frame of reference. The perception subsystem 154 is principally responsible for detecting, tracking, and/or identifying objects within the environment surrounding vehicle 111A. A machine learning model in accordance with some implementations can be utilized in tracking objects. The planning subsystem 156 is principally responsible for planning a trajectory or a path of motion for vehicle 111A over some timeframe given a desired destination as well as the static and moving objects within the environment. A machine learning model in accordance with some implementations can be utilized in planning a vehicle trajectory. The control subsystem 158 is principally responsible for generating suitable control signals for controlling the various controls in the vehicle control system 120 in order to implement the planned trajectory of the vehicle 111A. Similarly, a machine learning model can be utilized to generate one or more signals to control the autonomous vehicle 111A to implement the planned trajectory.

It will be appreciated that the collection of components illustrated in FIG. 1A for the vehicle control system 120 is merely one example. Individual sensors may be omitted in some implementations. Additionally, or alternatively, in some implementations, multiple sensors of the same types illustrated in FIG. 1A may be used for redundancy and/or to cover different regions around a vehicle. Moreover, there may be additional sensors of other types beyond those described above to provide actual sensor data related to the operation and environment of the wheeled land vehicle. Likewise, different types and/or combinations of control subsystems may be used in other implementations. Further, while subsystems 152-158 are illustrated as being separate from processor 122 and memory 124, it should be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processor(s) and/or memory. Subsystems may be implemented at least in part using various dedicated circuit logic, various processors, various field programmable gate arrays ("FPGA"), various application-specific integrated circuits ("ASIC"), various real time controllers, and the like, as noted above, multiple subsystems may utilize circuitry, processors, sensors, and/or other components. Further, the various components in the vehicle control system 120 may be networked in various manners.

In some implementations, the vehicle 111A may also include a secondary vehicle control system (not illustrated), which may be used as a redundant or backup control system for the vehicle 111A. In some implementations, the secondary vehicle control system may be capable of fully operating the autonomous vehicle 111A in the event of an adverse event in the vehicle control system 120, while in other implementations, the secondary vehicle control system may only have limited functionality, e.g., to perform a controlled stop of the vehicle 111A in response to an adverse event detected in the primary vehicle control system 120. In still other implementations, the secondary vehicle control system may be omitted.

In general, different architectures, including various combinations of software, hardware, circuit logic, sensors, networks, etc. may be used to implement the various components illustrated in FIG. 1A. Each processor may be implemented, for example, as a microprocessor and each memory may represent the random-access memory ("RAM") devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in the vehicle 111A, e.g., any cache memory in a processor, as well as any storage capacity used as a virtual memory, e.g., as stored on a mass storage device or another computer controller. One or more processors 122 illustrated in FIG. 1A, or entirely separate processors, may be used to implement additional functionality in the vehicle 111A outside of the purposes of autonomous control, e.g., to control entertainment systems, to operate doors, lights, convenience features, etc.

In addition, for additional storage, the vehicle 111A may include one or more mass storage devices, e.g., a removable disk drive, a hard disk drive, a direct access storage device ("DASD"), an optical drive (e.g., a CD drive, a DVD drive, etc.), a solid-state storage drive ("SSD"), network attached storage, a storage area network, and/or a tape drive, among others.

Furthermore, the vehicle 100 may include a user interface 118 to enable vehicle 111A to receive a number of inputs from and generate outputs for a user or operator, e.g., one or more displays, touchscreens, voice and/or gesture interfaces, buttons, and other tactile controls, etc. Otherwise, user input may be received via another computer or electronic device, e.g., via an app on a mobile device or via a web interface.

Moreover, the vehicle 111A may include one or more network interfaces, e.g., network interface 162, suitable for communicating with one or more networks 176 to permit the communication of information with other computers and electronic devices, including, for example, a central service, such as a cloud service, from which the vehicle 111A receives information including trained machine learning models and other data for use in autonomous control thereof. The one or more networks 176, for example, may be a communication network and include a wide area network ("WAN") such as the Internet, one or more local area networks ("LANs") such as Wi-Fi LANs, mesh networks, etc., and one or more bus subsystems. The one or more networks 176 may optionally utilize one or more standard communication technologies, protocols, and/or inter-process communication techniques. In some implementations, data collected by the one or more sensors 130 can be uploaded to a computing system 172 via the network 176 for additional processing. In the illustrated implementation, the vehicle 111A may communicate via the network 176 and signal line 178 with a computing system 172. In some implementations, the computing system 172 is a cloud-based computing device. Additionally, processing of autonomous vehicle data by computing system 172 in accordance with many implementations is described with respect to FIG. 2.

Each processor is illustrated in FIG. 1A, as well as various additional controllers and subsystems disclosed herein, generally operates under the control of an operating system and executes or otherwise relies upon various computer software applications, components, programs, objects, modules, data structures, etc., as described in greater detail below. Moreover, various applications, components, programs, objects, modules, etc. may also execute on one or more processors in another computer (e.g., computing system 172) coupled to vehicle 100 via network 176, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module, or sequence of instructions, or even a subset thereof, are referred to herein as "program code." Program code typically comprises one or more instructions that are resident at various times in various memory and storage devices, and that, when read and executed by one or more processors, perform the steps necessary to execute steps or elements embodying the various aspects of the present disclosure. Moreover, while implementations have and hereinafter are described in the context of fully functioning computers and systems, it should be appreciated that the various implementations described herein are capable of being distributed as a program product in a variety of forms, and that implementations can be implemented regardless of the particular type of computer readable media used to actually carry out the distribution.

Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.) among others.

In addition, various program code described hereinafter may be identified based upon the application within which it is implemented in a specific implementation. However, it should be appreciated that any particular program nomenclature that follows is used merely for convenience, and thus the present disclosure should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the present disclosure is not limited to the specific organization and allocation of program functionality described herein.

The example environment illustrated in FIG. 1A is not intended to limit implementations disclosed herein. Indeed, other alternative hardware and/or software environments may be used without departing from the scope of implementations disclosed herein.

Figure 2:
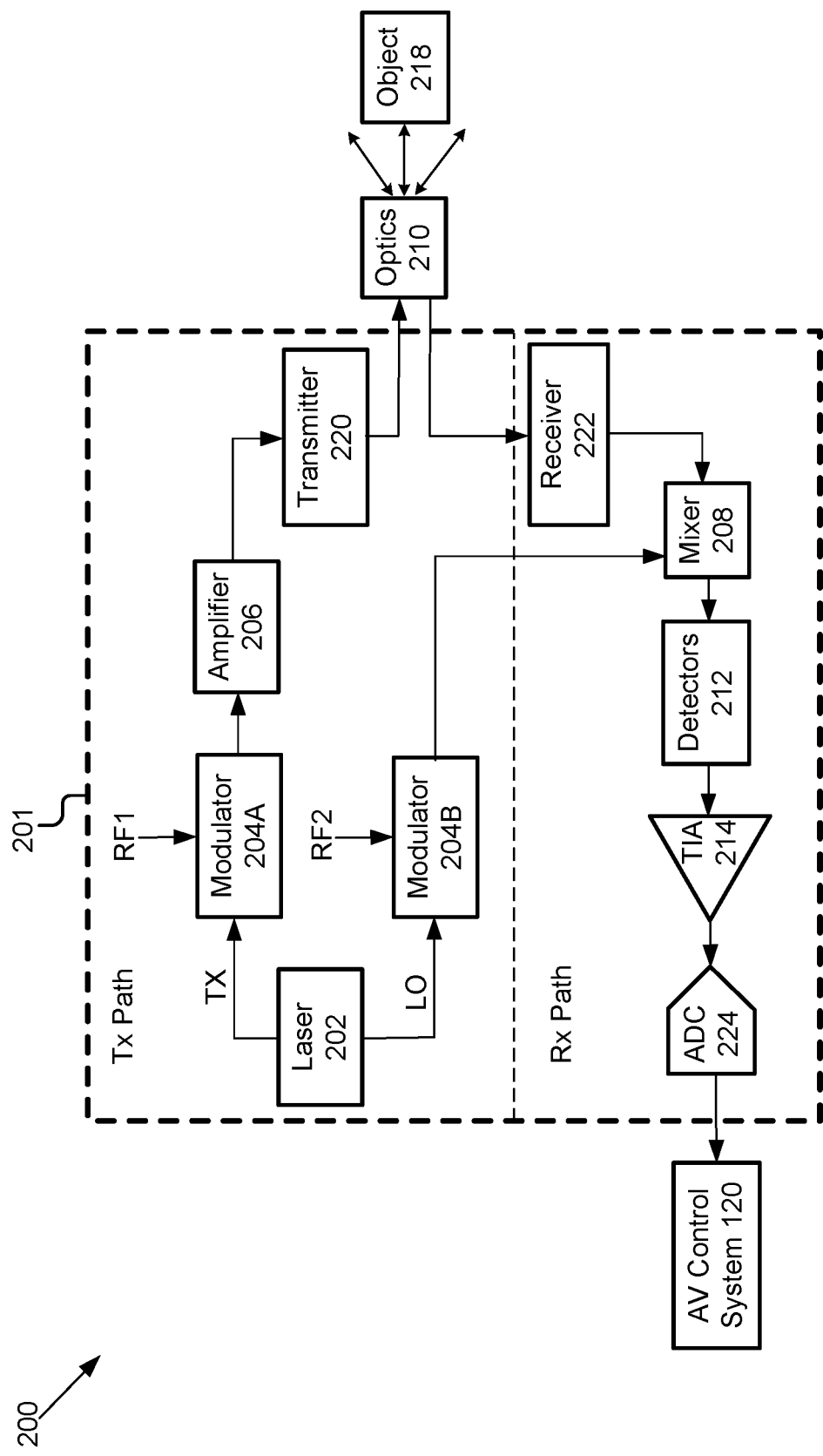
FIG. 2 is a block diagram illustrating an example of a LIDAR sensor system for an autonomous vehicle, according to some implementations.

A truck can include a lidar system (e.g., vehicle control system 120 in FIG. 1A, lidar system 201 in FIG. 2, etc.). In some implementations, the lidar system can use frequency modulation to encode an optical signal and scatter the encoded optical signal into free space using optics. By detecting the frequency differences between the encoded optical signal and a returned signal reflected back from an object, the frequency modulated (FM) lidar system can determine the location of the object and/or precisely measure the velocity of the object using the Doppler effect. An FM lidar system may use a continuous wave (referred to as, "FMCW lidar" or "coherent FMCW lidar") or a quasi-continuous wave (referred to as, "FMQW lidar"). The lidar system can use phase modulation (PM) to encode an optical signal and scatters the encoded optical signal into free space using optics.

An FM or phase-modulated (PM) lidar system may provide substantial advantages over conventional lidar systems with respect to automotive and/or commercial trucking applications. To begin, in some instances, an object (e.g., a pedestrian wearing dark clothing) may have a low reflectivity, in that it only reflects back to the sensors (e.g., sensors 130 in FIG. 1A) of the FM or PM lidar system a low amount (e.g., 10% or less) of the light that hit the object. In other instances, an object (e.g., a shiny road sign) may have a high reflectivity (e.g., above 10%), in that it reflects back to the sensors of the FM lidar system a high amount of the light that hits the object.

Regardless of the object's reflectivity, an FM lidar system may be able to detect (e.g., classify, recognize, discover, etc.) the object at greater distances (e.g., 2×) than a conventional lidar system. For example, an FM lidar system may detect a low reflectivity object beyond 300 meters, and a high reflectivity object beyond 400 meters.

To achieve such improvements in detection capability, the FM lidar system may use sensors (e.g., sensors 130 in FIG. 1A). In some implementations, these sensors can be single photon sensitive, meaning that they can detect the smallest amount of light possible. While an FM lidar system may, in some applications, use infrared wavelengths (e.g., 950 nm, 1550 nm, etc.), it is not limited to the infrared wavelength range (e.g., near infrared: 800 nm-1500 nm; middle infrared: 1500 nm-5600 nm; and far infrared: 5600 nm-1,000,000 nm). By operating the FM or PM lidar system in infrared wavelengths, the FM or PM lidar system can broadcast stronger light pulses or light beams while meeting eye safety standards. Conventional lidar systems are often not single photon sensitive and/or only operate in near infrared wavelengths, requiring them to limit their light output (and distance detection capability) for eye safety reasons.

Thus, by detecting an object at greater distances, an FM lidar system may have more time to react to unexpected obstacles. Indeed, even a few milliseconds of extra time could improve safety and comfort, especially with heavy vehicles (e.g., commercial trucking vehicles) that are driving at highway speeds.

Another advantage of an FM lidar system is that it provides accurate velocity for each data point instantaneously. In some implementations, a velocity measurement is accomplished using the Doppler effect which shifts frequency of the light received from the object based at least one of the velocity in the radial direction (e.g., the direction vector between the object detected and the sensor) or the frequency of the laser signal. For example, for velocities encountered in on-road situations where the velocity is less than 100 meters per second (m/s), this shift at a wavelength of 1550 nanometers (nm) amounts to the frequency shift that is less than 130 megahertz (MHz). This frequency shift is small such that it is difficult to detect directly in the optical domain. However, by using coherent detection in FMCW, PMCW, or FMQW lidar systems, the signal can be converted to the RF domain such that the frequency shift can be calculated using various signal processing techniques. This enables the autonomous vehicle control system to process incoming data faster.

Instantaneous velocity calculation also makes it easier for the FM lidar system to determine distant or sparse data points as objects and/or track how those objects are moving over time. For example, an FM lidar sensor (e.g., sensors 130 in FIG. 1A) may only receive a few returns (e.g., hits) on an object that is 300 m away, but if those return give a velocity value of interest (e.g., moving towards the vehicle at >70 mph), then the FM lidar system and/or the autonomous vehicle control system may determine respective weights to probabilities associated with the objects.

Faster identification and/or tracking of the FM lidar system gives an autonomous vehicle control system more time to maneuver a vehicle. A better understanding of how fast objects are moving also allows the autonomous vehicle control system to plan a better reaction.

Another advantage of an FM lidar system is that it has less static compared to conventional lidar systems. That is, the conventional lidar systems that are designed to be more light-sensitive typically perform poorly in bright sunlight. These systems also tend to suffer from crosstalk (e.g., when sensors get confused by each other's light pulses or light beams) and from self-interference (e.g., when a sensor gets confused by its own previous light pulse or light beam). To overcome these disadvantages, vehicles using the conventional lidar systems often need extra hardware, complex software, and/or more computational power to manage this "noise."

In contrast, FM lidar systems do not suffer from these types of issues because each sensor is specially designed to respond only to its own light characteristics (e.g., light beams, light waves, light pulses). If the returning light does not match the timing, frequency, and/or wavelength of what was originally transmitted, then the FM sensor can filter (e.g., remove, ignore, etc.) out that data point. As such, FM lidar systems produce (e.g., generates, derives, etc.) more accurate data with less hardware or software requirements, enabling safer and smoother driving.

Lastly, an FM lidar system is easier to scale than conventional lidar systems. As more self-driving vehicles (e.g., cars, commercial trucks, etc.) show up on the road, those powered by an FM lidar system likely will not have to contend with interference issues from sensor crosstalk. Furthermore, an FM lidar system uses less optical peak power than conventional lidar sensors. As such, some, or all of the optical components for an FM lidar can be produced on a single chip, which produces its own benefits, as discussed herein.

Figure 1B:
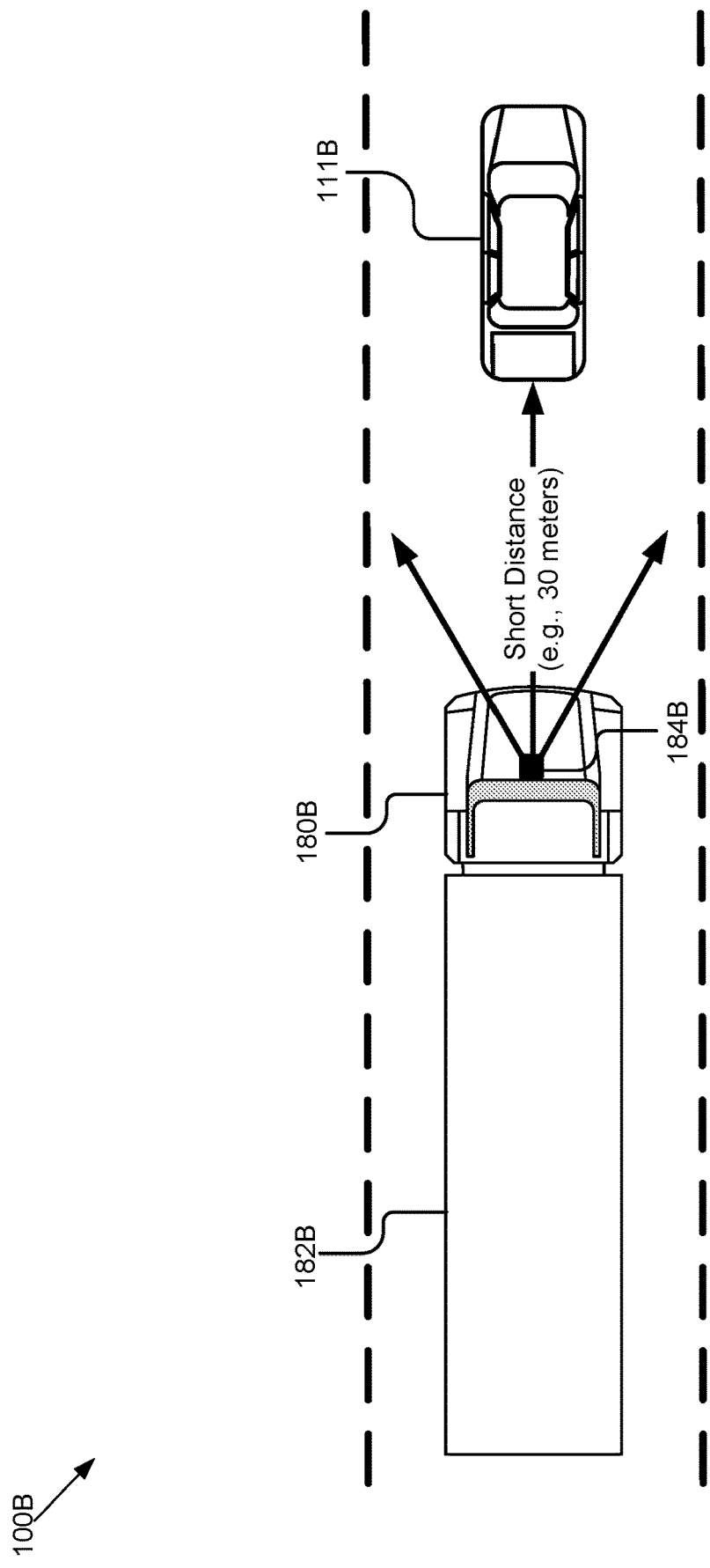
FIG. 1B is a block diagram illustrating an example of a system environment for autonomous commercial trucking vehicles, according to some implementations.

FIG. 1B is a block diagram illustrating an example of a system environment for autonomous commercial trucking vehicles, according to some implementations. The environment 100B includes a commercial truck 180B for hauling cargo 182B. In some implementations, the commercial truck 180B may include vehicles configured to long-haul freight transport, regional freight transport, intermodal freight transport (i.e., in which a road-based vehicle is used as one of multiple modes of transportation to move freight), and/or any other road-based freight transport applications. The commercial truck 180B may be a flatbed truck, a refrigerated truck (e.g., a reefer truck), a vented van (e.g., dry van), a moving truck, etc. The cargo 182B may be goods and/or produce. The commercial truck 180B may include a trailer to carry the cargo 182B, such as a flatbed trailer, a lowboy trailer, a step deck trailer, an extendable flatbed trailer, a side kit trailer, etc.

The environment 100B includes an object 111B (shown in FIG. 1B as another vehicle) that is within a distance range that is equal to or less than 30 meters from the truck.

The commercial truck 180B may include a lidar system 184B (e.g., an FM lidar system, vehicle control system 120 in FIG. 1A, lidar system 201 in FIG. 2, etc.) for determining a distance to the object 111B and/or measuring the velocity of the object 111B. Although FIG. 1B shows that one lidar system 184B is mounted on the front of the commercial truck 180B, the number of lidar systems and the mounting area of the lidar system on the commercial truck are not limited to a particular number or a particular area. The commercial truck 180B may include any number of lidar systems 184B (or components thereof, such as sensors, modulators, coherent signal generators, etc.) that are mounted onto any area (e.g., front, back, side, top, bottom, underneath, and/or bottom) of the commercial truck 180B to facilitate the detection of an object in any free-space relative to the commercial truck 180B.

As shown, the lidar system 184B in environment 100B may be configured to detect an object (e.g., another vehicle, a bicycle, a tree, street signs, potholes, etc.) at short distances (e.g., 30 meters or less) from the commercial truck 180B.

Figure 1C:
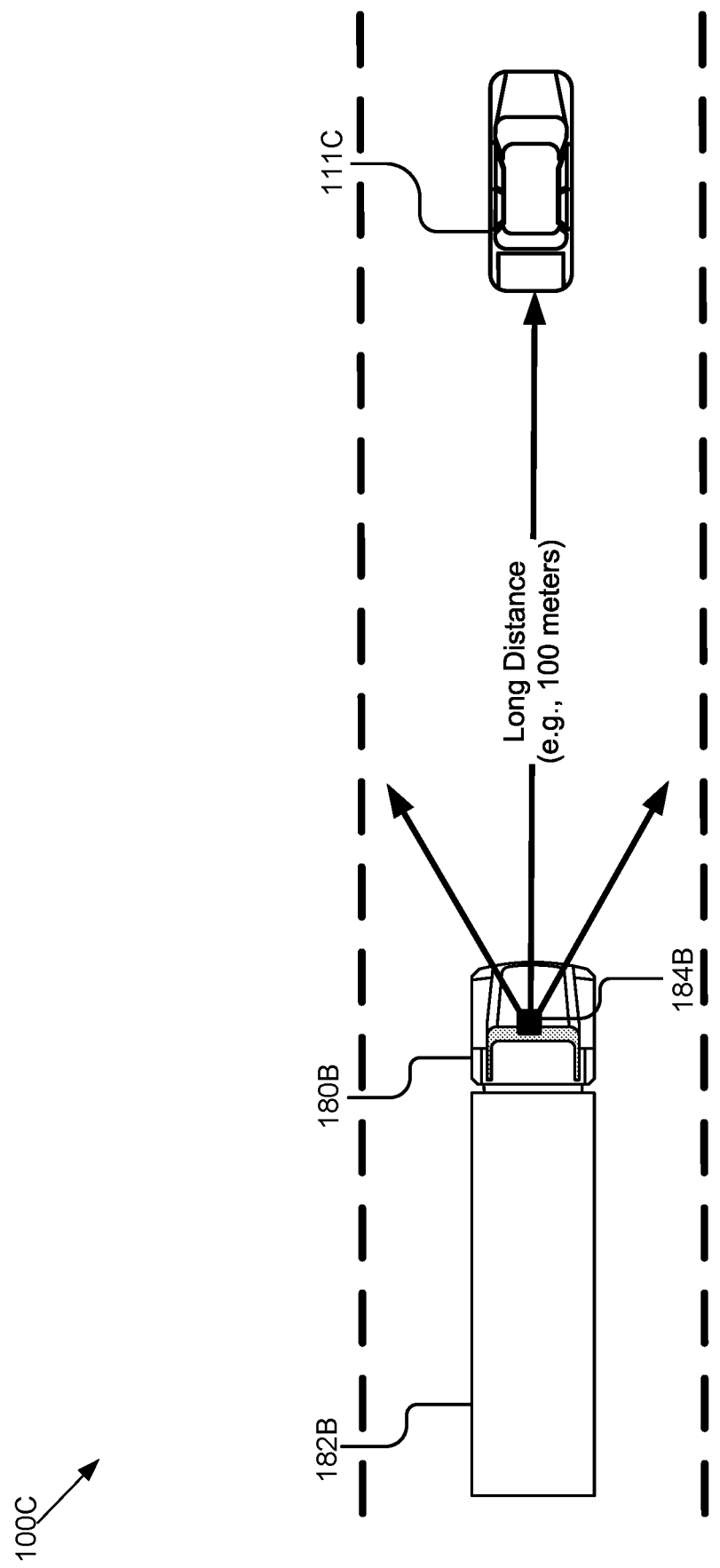
FIG. 1C is a block diagram illustrating an example of a system environment for autonomous commercial trucking vehicles, according to some implementations.

FIG. 1C is a block diagram illustrating an example of a system environment for autonomous commercial trucking vehicles, according to some implementations. The environment 100C includes the same components (e.g., commercial truck 180B, cargo 182B, lidar system 184B, etc.) that are included in environment 100B.

The environment 100C includes an object 111C (shown in FIG. 1C as another vehicle) that is within a distance range that is (i) more than 30 meters and (ii) equal to or less than 150 meters from the commercial truck 180B. As shown, the lidar system 184B in environment 100C may be configured to detect an object (e.g., another vehicle, a bicycle, a tree, street signs, potholes, etc.) at a distance (e.g., 100 meters) from the commercial truck 180B.

Figure 1D:
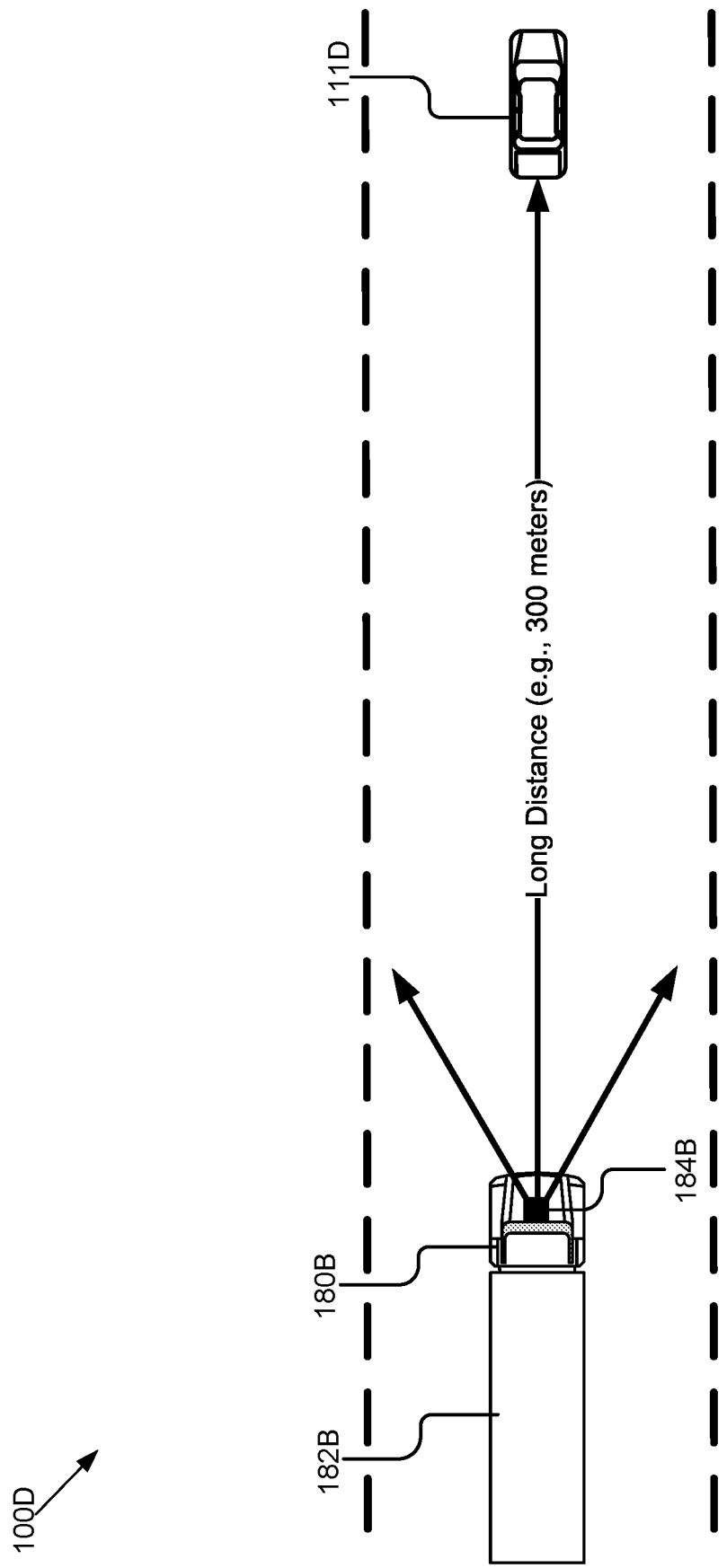
FIG. 1D is a block diagram illustrating an example of a system environment for autonomous commercial trucking vehicles, according to some implementations.

FIG. 1D is a block diagram illustrating an example of a system environment for autonomous commercial trucking vehicles, according to some implementations. The environment 100D includes the same components (e.g., commercial truck 180B, cargo 182B, lidar system 184B, etc.) that are included in environment 100B.

The environment 100D includes an object 111D (shown in FIG. 1D as another vehicle) that is within a distance range that is more than 150 meters from the commercial truck 180B. As shown, the lidar system 184B in environment 100D may be configured to detect an object (e.g., another vehicle, a bicycle, a tree, street signs, potholes, etc.) at a distance (e.g., 300 meters) from the commercial truck 180B.

In commercial trucking applications, it is important to effectively detect objects at all ranges due to the increased weight and, accordingly, longer stopping distance required for such vehicles. FM lidar systems (e.g., FMCW and/or FMQW systems) or PM lidar systems are well-suited for commercial trucking applications due to the advantages described above. As a result, commercial trucks equipped with such systems may have an enhanced ability to safely move both people and goods across short or long distances, improving the safety of not only the commercial truck but of the surrounding vehicles as well. In various implementations, such FM or PM lidar systems can be used in semi-autonomous applications, in which the commercial truck has a driver, and some functions of the commercial truck are autonomously operated using the FM or PM lidar system, or fully autonomous applications, in which the commercial truck is operated entirely by the FM or lidar system, alone or in combination with other vehicle systems.

In a lidar system that uses CW modulation, the modulator modulates the laser light continuously. For example, if a modulation cycle is 10 seconds, an input signal is modulated throughout the whole 10 seconds. Instead, in a lidar system that uses quasi-CW modulation, the modulator modulates the laser light to have both an active portion and an inactive portion. For example, for a 10 second cycle, the modulator modulates the laser light only for 8 seconds (sometimes referred to as, "the active portion"), but does not modulate the laser light for 2 seconds (sometimes referred to as, "the inactive portion"). By doing this, the lidar system may be able to reduce power consumption for the 2 seconds because the modulator does not have to provide a continuous signal.

In Frequency Modulated Continuous Wave (FMCW) lidar for automotive applications, it may be beneficial to operate the lidar system using quasi-CW modulation where FMCW measurement and signal processing methodologies are used, but the light signal is not in the on-state (e.g., enabled, powered, transmitting, etc.) all the time. In some implementations, Quasi-CW modulation can have a duty cycle that is equal to or greater than 1% and up to 50%. If the energy in the off-state (e.g., disabled, powered-down, etc.) can be expended during the actual measurement time then there may be a boost to signal-to-noise ratio (SNR) and/or a reduction in signal processing requirements to coherently integrate all the energy in the longer time scale.

FIG. 2 is a block diagram illustrating an example environment of a lidar sensor system for autonomous vehicles, according to some implementations. The environment 200 includes a lidar sensor system 201 that includes a transmit (Tx) path and a receive (Rx) path. The Tx path includes one or more Tx input/output ports (not shown in FIG. 2), and the Rx path includes one or more Rx input/output ports (not shown in FIG. 2).

In some implementations, a semiconductor substrate and/or semiconductor package may include the Tx path and the Rx. In some implementations, the semiconductor substrate and/or semiconductor package may include at least one of silicon photonics circuitry, programmable logic controller (PLC), or III-V semiconductor circuitry.

In some implementations, a first semiconductor substrate and/or a first semiconductor package may include the Tx path and a second semiconductor substrate and/or a second semiconductor package may include the Rx path. In some arrangements, the Rx input/output ports and/or the Tx input/output ports may occur (or be formed/disposed/located/placed) along one or more edges of one or more semiconductor substrates and/or semiconductor packages.

The environment 200 includes one or more transmitters 216 and one or more receivers 218.

The environment 200 includes one or more optics 210 (e.g., an oscillatory scanner, a unidirectional scanner, a Risley prism, a circulator optic, and/or a beam collimator, etc.) that are coupled to the lidar system 201. In some implementations, the one or more optics 210 may be coupled to the Tx path via the one or more Tx input/output ports. In some implementations, the one or more optics 210 may be coupled to the Rx path via the one or more Rx input/output ports.

The environment 200 includes a vehicle control system 120 (e.g., vehicle control system 120 in FIG. 1A) that is coupled to the lidar system 201. In some implementations, the vehicle control system 120 may be coupled to the Rx path via the one or more Rx input/output ports.

The Tx path may include a laser source 202, a modulator 204A, a modulator 204B, an amplifier 206, and one or more transmitters 216. The Rx path may include one or more receivers 218, a mixer 208, a detector 212, a transimpedance amplifier (TIA) 214, and one or more analog-to-digital converters (ADCs). Although FIG. 2 shows only a select number of components and only one input/output channel; the environment 200 may include any number of components and/or input/output channels (in any combination) that are interconnected in any arrangement to facilitate combining multiple functions of a lidar system, to support the operation of a vehicle.

The laser source 202 may be configured to generate a light signal (or beam) that is derived from (or associated with) a local oscillator (LO) signal. In some implementations, the light signal may have an operating wavelength that is equal to or substantially equal to 1550 nanometers. In some implementations, the light signal may have an operating wavelength that is between 1400 nanometers and 1440 nanometers.

The laser source 202 may be configured to provide the light signal to the modulator 204A, which is configured to modulate a phase and/or a frequency of the light signal based on a first radio frequency (RF) signal (shown in FIG. 2 as, "RF1") and using Continuous Wave (CW) modulation or quasi-CW modulation to generate a modulated light signal. The modulator 204A may be configured to send the modulated light signal to the amplifier 206. The amplifier 206 may be configured to amplify the modulated light signal to generate an amplified light signal to the optics 210 via the one or more transmitters 216. The one or more transmitters 216 may include one or more optical waveguides or antennas.

The optics 210 may be configured to steer the amplified light signal that it receives from the Tx path into an environment within a given field of view toward an object 218, may receive a returned signal reflected back from the object 218, and provide the returned signal to the mixer 208 of the Rx path via the one or more receivers 218. The one or more receivers 218 may include one or more optical waveguides or antennas. In some arrangements, the transmitters 216 and the receivers 218 may constitute one or more transceivers (not shown in FIG. 2). In some arrangements, the one or more transceivers may include a monostatic transceiver or a bistatic transceiver.

The laser source 202 may be configured to provide the LO signal to the modulator 204B, which is configured to modulate a phase and/or a frequency of the LO signal based on a second RF signal (shown in FIG. 2 as, "RF2") and using Continuous Wave (CW) modulation or quasi-CW modulation to generate a modulated LO signal and send the modulated LO signal to the mixer 208 of the Rx path.

The mixer 208 may be configured to mix (e.g., combine, multiply, etc.) the modulated LO signal with the returned signal to generate a down-converted signal and send the down-converted signal to the detector 212. In some arrangements, the mixer 208 may be configured to send the modulated LO signal to the detector 212.

The detector 212 may be configured to generate an electrical signal based on the down-converted signal and send the electrical signal to the TIA 214. In some arrangements, the detector 212 may be configured to generate an electrical signal based on the down-converted signal and the modulated signal.

The TIA 214 may be configured to amplify the electrical signal and send the amplified electrical signal to the vehicle control system 120 via the one or more ADCs 220.

In some implementations, the TIA 214 may have a peak noise-equivalent power (NEP) that is less than 5 picowatts per square root Hertz (i.e., 5×10-12 Watts per square root Hertz). In some implementations, the TIA 214 may have a gain between 4 kiloohms and 25 kiloohms.

In some implementations, detector 212 and/or TIA 214 may have a 3-decibel bandwidth between 80 kilohertz (kHz) and 450 megahertz (MHz).

The vehicle control system 120 may be configured to determine a distance to the object 218 and/or measure the velocity of the object 218 based on the one or more electrical signals that it receives from the TIA via the one or more ADCs 220.

In some implementations, modulator 204A and/or modulator 204B may have a bandwidth between 400 megahertz (MHz) and 1000 (MHz).

In some implementations, the modulator 204A may be configured to send a first modulated light (optical) signal and a second modulated light (optical) signal to the amplifier 206. The amplifier 206 may be configured to amplify the first and second modulated light signals to generate amplified light signals to the optics 210 via the transmitters 216. The optics 210 may be configured to steer the first and second modulated light signals that it receives from the Tx path into an environment within a given field of view toward an object 218, may receive corresponding first and second returned signals reflected back from the object 218, and provide the first and second returned signals to the mixer 208 of the Rx path via the receivers 218. The modulator 204B may be configured to generate (1) a first modulated LO signal associated with the first modulated light signal and (2) a second modulated LO signal associated with the second modulated light signal and send the first and second modulated LO signals to the mixer 208 of the Rx path. The mixer 208 may be configured to pair (e.g., associate, link, identify, etc.) the first returned light signal and the first modulated LO signal, and mix (e.g., combine, multiply, etc.) the first returned light signal and the first modulated LO signal to generate a first down-converted signal and send the first down-converted signal to the detector 212. Similarly, the mixer 208 may be configured to pair the second returned light signal and the second modulated LO signal and mix the second returned light signal and the second modulated LO signal to generate a second down-converted signal and send the second down-converted signal to the detector 212. The detector 212 may be configured to generate first and second electrical signals based on the first and second down-converted signal, respectively. The vehicle control system 120 may be configured to determine a distance to the object 218 and/or measure the velocity of the object 218 based on the first and second electrical signals, received via TIA 214 and ADCs 220.

Figure 3:
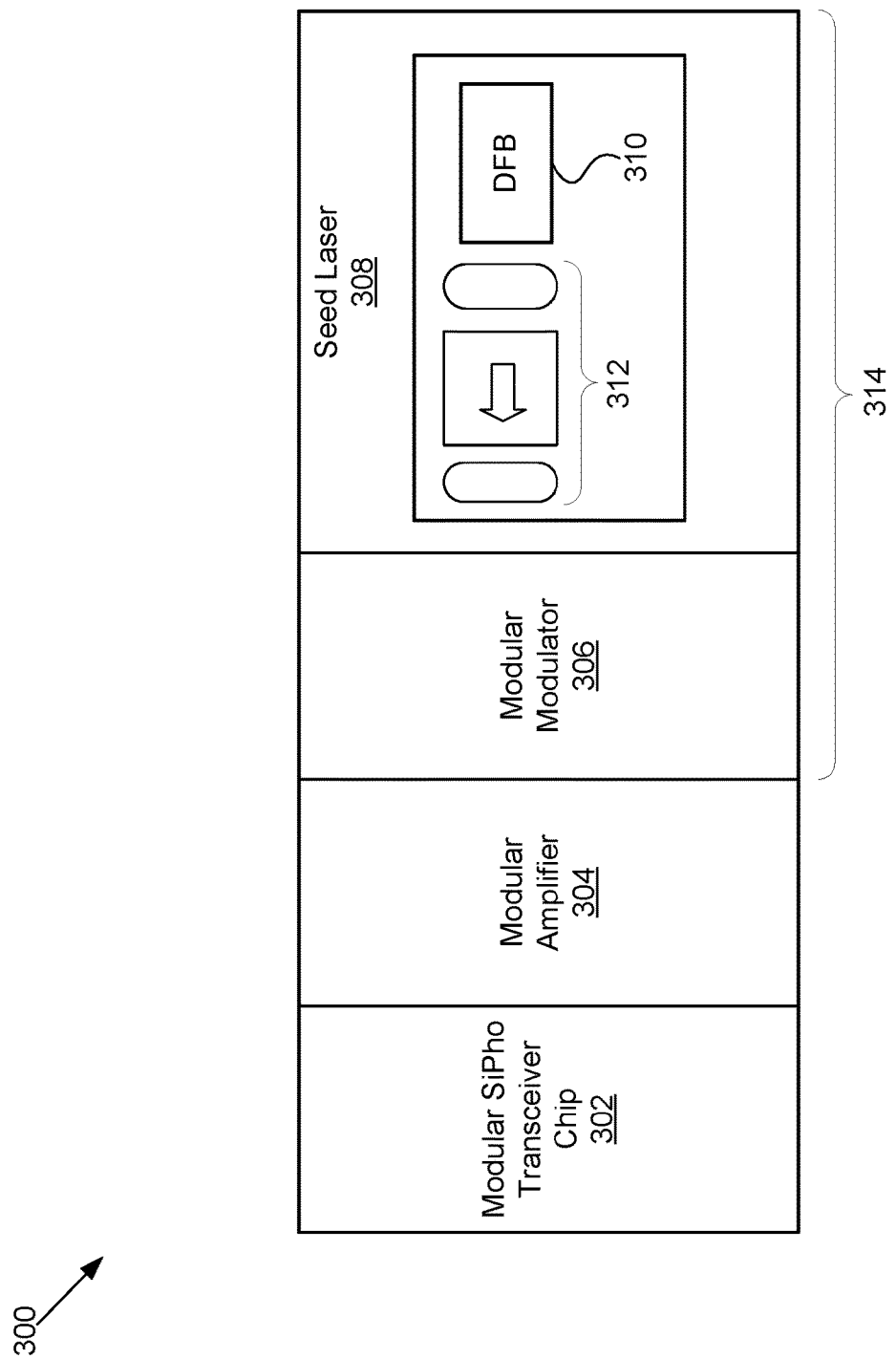
FIG. 3 is a high-level block diagram illustrating example components for a LIDAR system for autonomous vehicles, according to some implementations.

FIG. 3 depicts a high-level block diagram illustrating example components 302, 304, 306 and 308 for a modular LIDAR system 300 for autonomous vehicles, according to some implementations. According to some implementations, the modular LIDAR system 300 comprises a seed laser 308, a modular modulator 306, a modular amplifier 304 and a modular transceiver chip 302. As noted above, the modular LIDAR system 300 is particularly advantageous because its modular design allows each of the components 302, 304, 306 and 308 to be discrete integrated circuits optically coupled by micro-lenses. This provides higher yield of the modular components 302, 304, 306 and 308 and ease of configurability and assembly for different variations of each modular component 302, 304, 306 and 308. This modular architecture is particularly advantageous because each of the seed laser 308, the modular modulator 306, the modular amplifier 304 and the modular transceiver chip 302 may be constructed and tested individually, then assembled into the configurations that will be described below with reference to FIGS. 4 and 5. Essentially, the modular architecture of FIGS. 3, 4 and 5 includes only discrete integrated circuits plus micro-lenses. This modular architecture eliminates the need for any fiber to optically couple the components of the modular architecture.

The seed laser 308 is provided to generate a light beam. In some implementations, the seed laser 308 may be a light source, for example, a distributed feedback (DFB) diode laser source. The light or beam from the seed laser 308 may be optically coupled for input to the modular modulator 306. In some implementations, the seed laser 308 includes a DFB diode laser source 310 and a micro-lens assembly 312 that couples the DFB diode laser source 310 to the modular modulator 306. The seed laser 308 is modular in that it can be constructed as a single integrated circuit.

The modular modulator 306 receives the light beam generated by the seed laser and generates a modulated light signal. In some implementations, the modular modulator 306 includes a modulator and a splitter (See FIGS. 4 and 5 below). In some implementations, the modular modulator 306 performs in-phase and quadrature modulation to generate the modulated beam. In some implementations, the modular modulator 306 performs phase modulation to generate the modulated beam. The splitter is coupled to the output of the modulator and provides the output of the modular modulator 306. In some implementations, the splitter is a single splitter that is a passive component that is hybridly integrated with the modulator of modular modulator 306, as will be described in more detail below with reference to FIG. 4. In some implementations, the splitter is a plurality of splitters, as will be described in more detail below with reference to FIG. 5. The modular modulator 306 is modular in that it can be constructed as a single integrated circuit.

In some implementations, the seed laser 308 and the modular modulator 306 may be integrated to form a seed laser assembly 314. In some implementations, the seed laser assembly 314 is mounted on the first submount and the modular transceiver chip 302 coupled is mounted on a second submount for aligning the height of the seed laser assembly 314 and the height of the modular transceiver chip 302 for optical coupling.

The modular amplifier 304 is one or more semiconductor optical amplifiers (SOA). In some implementations, the modular amplifier 304 is one or more tapered semiconductor optical amplifiers (TSOA). In some implementations, the modular amplifier 304 is one or more SOA array chips. Each SOA array chip includes integrated U-turns and other passive components for optical amplification. In some implementations, the SOA array chip may be a III-V semiconductor-based integrated photonic device in which all of its components are made of III-V materials and formed/disposed on a single substrate made of III-V materials. Moreover, in some implementations, each SOA array chip may include four to five channels and be configured to amplify the beam through stimulated emission. The modular amplifier 304 is optically coupled to the modular modulator 306 by micro-lenses (not shown). Similarly, the modular amplifier 304 is optically coupled to provide the amplified signal to the modular transceiver chip 302 by micro-lenses (not shown). The details of this optical coupling will be described in more detail below with reference to FIGS. 4 and 5.

In some implementations, the modular silicon photonics (SiPho) transceiver chip 302 includes at least one of silicon photonics circuitry, programmable logic controller (PLC), or III-V semiconductor circuitry. The modular SiPho transceiver chip 302 processes the coupled light using the modular amplifier 304. The modular SiPho transceiver chip 302 includes a plurality of coherent pixels that process the output of the modular amplifier 304 and emits the light out from the surface of the modular SiPho transceiver chip 302 includes via an optical window of the integrated chip packaging. The modular SiPho transceiver chip 302 processes the light collected off a reflection from a target and couples the detected photocurrent to the transimpedance amplifier (not shown). The transimpedance amplifier converts the photocurrent into an electrical voltage which is then coupled out of the integrated chip packaging.

Figure 4:
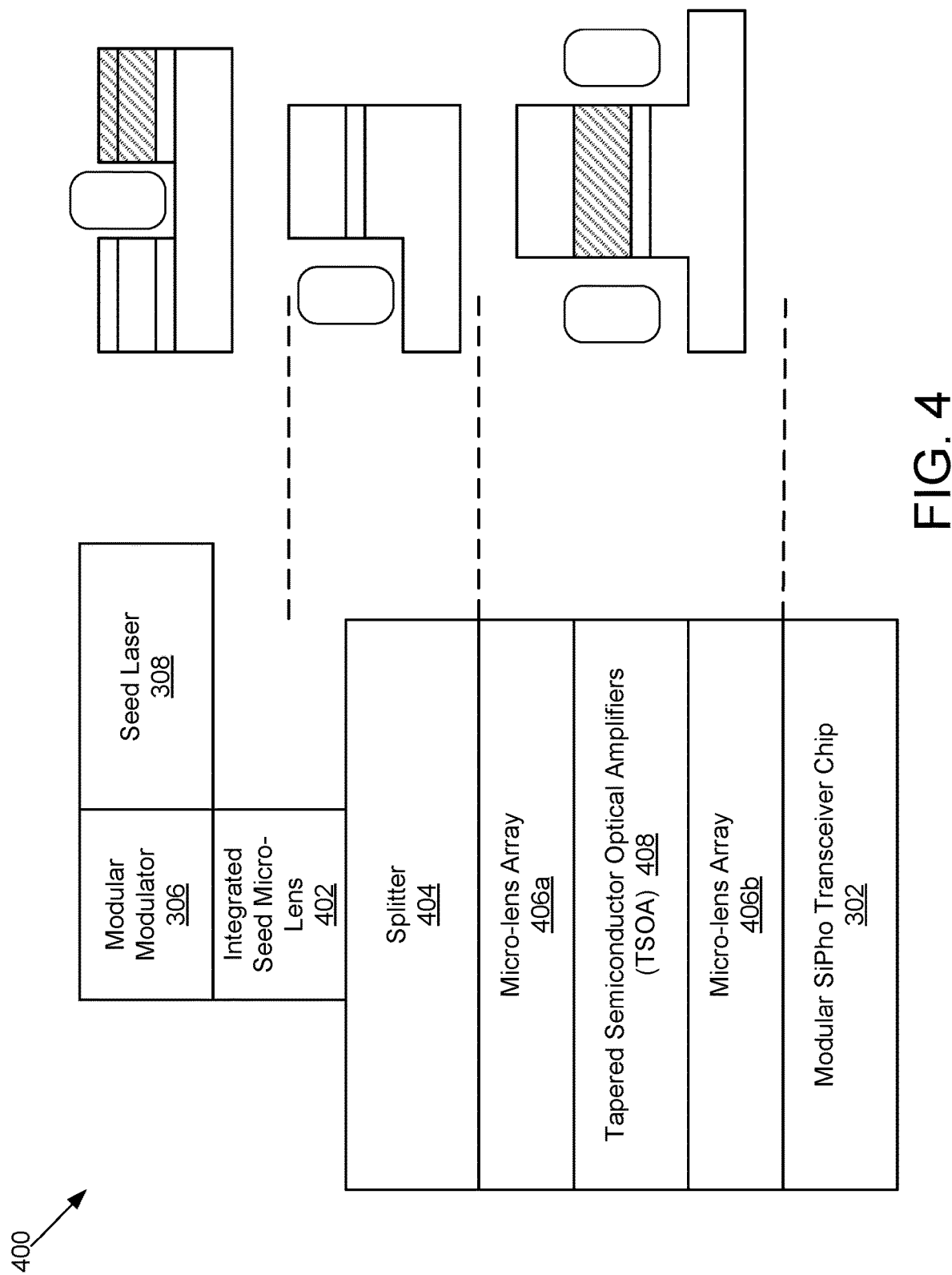
FIG. 4 is a high-level block diagram illustrating example modular components for a LIDAR system with horizontal integration for autonomous vehicles, according to some implementations.

FIG. 4 is a high-level block diagram illustrating example modular components for a LIDAR system 400 with horizontal integration for autonomous vehicles, according to some implementations. As illustrated, the LIDAR system 400 comprises: a seed laser 308, a modular modulator 306, an integrated seed micro-lens 402, a splitter 404, a first micro-lens array 406a, an array of TSOAs 408, a second micro-lens array 406b, and the modular SiPho transceiver chip 302.

In this implementation, the seed laser 308, the modular modulator 306 and the modular SiPho transceiver chip 302 have a similar structure, form, and function as described above with reference to FIG. 3 so that description will not be repeated here. The modular modulator 306 is coupled by an integrated seed micro-lens 402 to the splitter 404. In other words, the seed laser 308, the modular modulator 306, and the integrated seed micro-lens 402 can be integrated into a single integrated circuit. An example configuration for such integration is shown in cross-section to the left of these components 306, 308, 402 in FIG. 4 with a p-up semiconductor structure.

The splitter 404 is a 1-to-n splitter that splits the optical signal output by the modular modulator 306 through the integrated seed micro-lens 402 to the splitter 404 into n signals. In some implementations, the core pitch of the splitter 404 is in a range of 450 to 550 micrometers. In some implementations, the splitter 404 is a 1-to-16 splitter with a core pitch of 500 µm. In some implementations, the splitter 404 is a 1-to-32 splitter with a core pitch of 500 µm. In some implementations, the splitter 404 is a passive optical splitter. In some implementations, the splitter 404 is formed on one or more integrated circuits. An example configuration for such integration is shown in the cross-section to the left of these components 402 and 404 in FIG. 4 with a p-down semiconductor structure.

The first micro-lens array 406a is used to optically couple the output of the splitter 404 to the array of TSOAs 408. The first micro-lens array 406a includes a micro-lens for each signal output by the splitter 404. In some implementations, the first micro-lens array 406a includes 16 micro-lenses with 500 µm pitch. In some implementations, the first micro-lens array 406a includes 32 micro-lenses with 500 µm pitch. Each lens in the first micro-lens array 406a couples an output of the splitter 404 to the corresponding TSOA in the array of TSOAs 408. In some implementations, the seed micro-lens 402 and the first micro-lens array 406a lens array compensates for a height difference in a first height of a submount of the modular modulator 306 and a second height of a submount of the modular amplifier 408.

The array of TSOAs 408 has the same number of TSOAs as output signals from the splitter 404. In other words, there is one corresponding TSOA for each signal output by the splitter 404. In some implementations, the splitter 404 outputs 16 optical signals, and the array of TSOAs 408 includes 16 TSOAs. In some implementations, the splitter 404 outputs 32 optical signals, and the array of TSOAs 408 includes 32 TSOAs. In some implementations, the array of TSOAs 408 includes 16 aperture bars or individual many bars where the array includes 16 TSOAs. As will be described below, the array of TSOAs includes double sided cooling, and real estate on the side for flatness. In some implementations, the TSOAs have 500 µm pitch. It should be understood that in other implementations, the array could be other types of SOAs. The array of TSOAs 408 is optically coupled by the first micro-lens array 406a to the splitter 404 and by the second micro-lens array 406b to the modular SiPho transceiver chip 302.

The second micro-lens array 406b is used to optically couple the output of the array of TSOAs 408 to the modular SiPho transceiver chip 302. The second micro-lens array 406b includes a micro-lens for each signal output by the array of TSOAs 408. Essentially, the second micro-lens array 406b includes a micro-lens for each TSOA in the array of TSOAs 408. In some implementations, the second micro-lens array 406b includes 16 micro-lenses with 500 µm pitch. In some implementations, the second micro-lens array 406b includes 32 micro-lenses with 500 µm pitch. Each lens in the second micro-lens array 406b couples an output of a TSOA to a corresponding input of the modular SiPho transceiver chip 302.

In some implementations, the first micro-lens array 406a, the array of TSOAs 408, and the second micro-lens array 406b is formed on one integrated circuit. An example configuration for such integration is shown in cross-section to the left of these components 406a, 408, and 406b in FIG. 4 with a p-down semiconductor structure.

The above modular components 306, 402, 404, 406a, 408, 406b, and 302 are horizontally integrated, meaning that each of the semiconductor chips forming each modular component are stacked upon each other as depicted. This only requires horizontal alignment of different components to make sure the light is transferred from one modular component to the other as needed for optical coupling. In some implementations, the optical ports on each two chips that are aligned must be on the same pitch and have matching optical mode size and facet angle according to the Snell law.

FIG. 5 is a high-level block diagram illustrating example modular components for a LIDAR system 500 with horizontal or vertical integration for autonomous vehicles, according to some implementations. The LIDAR system 500 comprises: a seed laser 308, a modular modulator 306, a plurality of seed micro-lens 502a-502d, a plurality of splitters 504a-50d, a first plurality of micro-lens arrays 506a-506d, plurality of TSOA chips 508a-508d, a second plurality of micro-lens arrays 510a-510d, and the modular SiPho transceiver chip 302.

The LIDAR system 500 of FIG. 5 is made even further modular by dividing the splitter 404 into a plurality of splitter chips 504a-504b; the first micro-lens array 406a into a plurality of micro-lens arrays 506a-506d; the TSOA chip 408 into a plurality of TSOA chips 508a-508d; and the second micro-lens array 406b into a plurality of micro-lens arrays 510a-510d. Such a modification to the modular architecture increases the yield and reliability by having components that are more easily manufactured. This architecture does require vertical or horizontal alignment of the increased number of modular components to achieve the same architectural output.

In this implementation, the seed laser 308, the modular modulator 306 and the modular SiPho transceiver chip 302 have a similar structure, form, and function as described above with reference to FIGS. 3 and 4 so that description will not be repeated here.

The modular modulator 306 is coupled to a plurality of micro-lens 502a-502d. Each of the plurality of micro-lenses 502a-502d is optically coupled to a corresponding splitter 504a-504d. For example, micro-lens 502a couples the modular modulator 306 to the splitter 504a. Similarly, micro-lens 502b couples the modular modulator 306 to splitter 504b; micro-lens 502c couples the modular modulator 3062 the splitter 504c; and micro-lens 502d couples the modular modulator to the splitter 504c.

In some implementations, the plurality of splitters 504a-504d are each a splitter chip. For an example comparison, if a similar architecture as FIG. 4 is desired, and the modular splitter 404 is a 1-to-16 splitter, the plurality of splitters 504a-504d would each be a 1-to-4 splitter chip; therefore, the four splitter chips 504a-504d of FIG. 5 would provide the same function as the single modular splitter 404 of FIG. 4. Each of the plurality of splitters 504a-504d couples a respective micro-lens 502a-502d to a respective micro-lens array 506a-506d. For example, the splitter 504a couples the micro-lens 502a to the micro-lens array 506a, the splitter 504b couples the micro-lens 502b to the micro-lens array 506b, the splitter 504c couples the micro-lens 502c to the micro-lens array 506c; and the splitter 504d couples the micro-lens 502d to the micro-lens array 506d. It should be understood that FIG. 5 illustrates how any number of splitter chips with a smaller splitting ratio can be used in place of a single splitter ship with a greater splitting ratio in a modular manner.

As noted above, each splitter 504a-504d is coupled to a respective micro-lens array 506a-506d. In some implementations, there are four micro-lens arrays 506a-506d. Continuing the comparison to the modular design of FIG. 4 to that of FIG. 5, the single micro-lens array 406a is replaced by a plurality of micro-lens arrays 506a-506d. If, by way of example, the single micro-lens 406a included 16 micro-lenses with 500 µm pitch and a similar architecture was desired, each micro-lens array 506a-506d in the plurality of micro-lens arrays 506a-506d would include 4 micro-lenses with 500 µm pitch. In some implementations, the number of micro-lens arrays and the number of micro-lenses in each array respectively correspond to the numbers of signals produced by the splitter chips 504a-504d. Each micro-lens array in the plurality of micro-lens arrays 506a-506d is in turn coupled to provide the respective optical signals to a respective TSOA chip 508a-508d. For example, micro-lens array 506a provides optical signals to TSOA chip 508a, micro-lens array 506b provides optical signals to TSOA chip 508b, and so on.

As shown in FIG. 5, each of the plurality of TSOA chips 508a-508d amplifies the optical signal received from its corresponding micro-lens array 506a-506d. In some implementations, the design includes four TSOA chips 508a-508d. Again, continuing the comparison to the modular design of FIG. 4 to that of FIG. 5, the single array of TSOAs 408 is replaced by a plurality of TSOA chips 508a-508d. In contrast to the single array of TSOAs 408, each of the TSOA chips 508a-508d includes 4 TSOAs. The plurality of TSOA chips 508a-508d may have 16 aperture bars or individual many bars, double sided cooling, real estate on the side for flatness, and 500 µm pitch in some implementations. It should be understood that in other implementations, the TSOA chips 508a-508d could be other types of SOAs.

Each of the plurality of TSOA chips 508a-508d is optically coupled by a corresponding micro-lens array 510a-510d to the modular SiPho transceiver chip 302. The second plurality of micro-lens arrays 510a-510d may be similar in form and function to the first plurality of micro-lens arrays 506a-506d but coupling the respective TSOA chips 508a-508d to the modular SiPho transceiver chip 302. In this implementation of the design, the number of micro-lens arrays 510a-510d corresponds to the number of TSOA chips 508a-508d.

Figure 6:
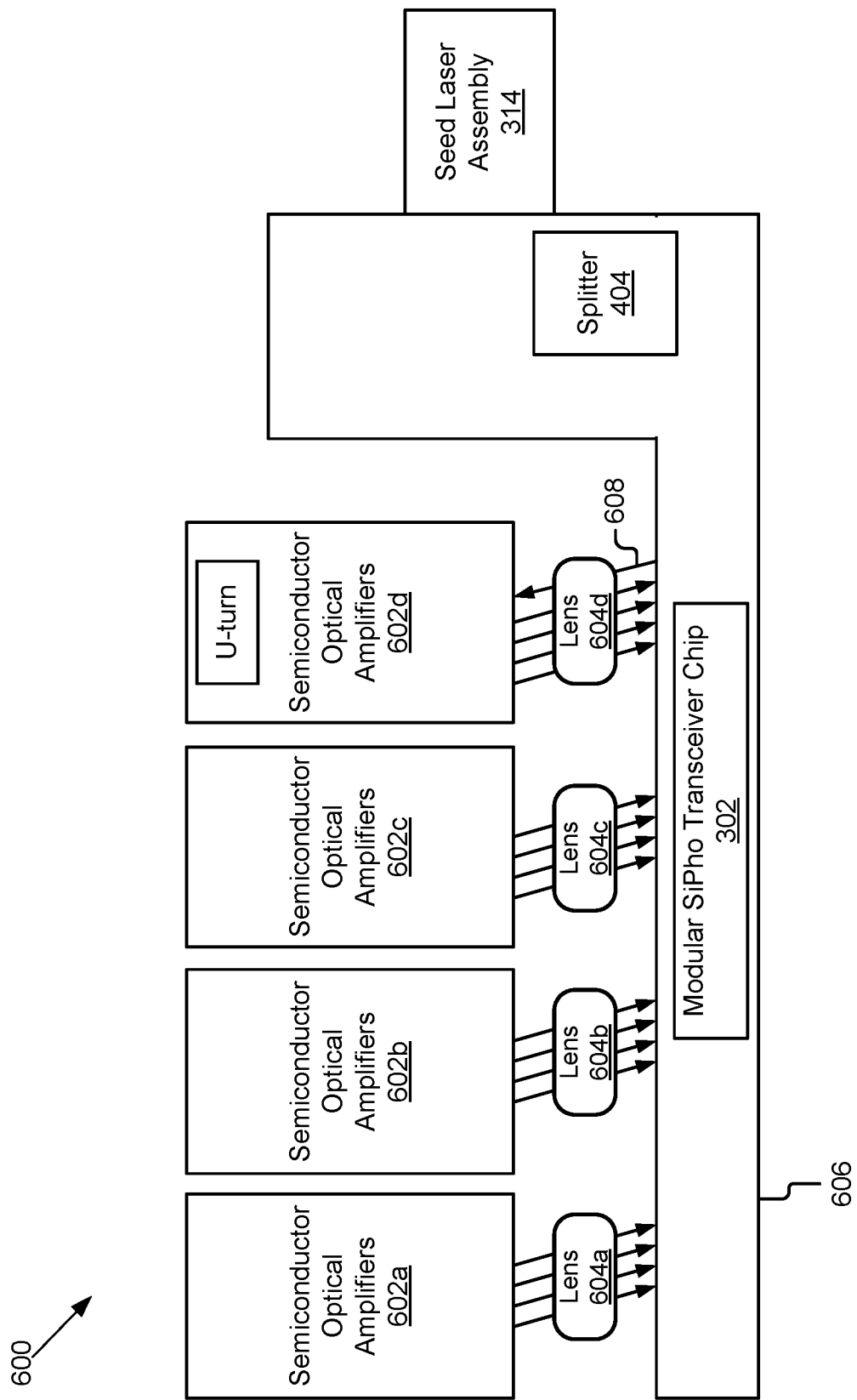
FIG. 6 is a high-level block diagram illustrating an example plain view of the modular components for a LIDAR system for autonomous vehicles, according to some implementations.

FIG. 6 shows a high-level block diagram illustrating an example plain view of the modular components for a LIDAR system 600 for an autonomous vehicle, according to some implementations. FIG. 6 shows one planar implementation and layout for the modular components of the present disclosure. In some implementations, the LIDAR system 600 comprises the seed laser assembly 314, the splitter 404, the modular SiPho transceiver chip 302, a plurality of semiconductor optical amplifiers 602a-602d, and a plurality of lenses 604a-604d. As shown, the seed laser assembly 314 inputs a light beam to the modular components on an integrated circuit 606 including the splitter 404 and the modular SiPho transceiver chip 302. The integrated circuit 606 is optically coupled by signal line 608 to provide the optical input to 602d of the plurality of semiconductor optical amplifiers 602a-602d via a lens 604d. The semiconductor optical amplifiers 602a-602d are coupled to send and receive optical signals from each other. Additionally, each of the plurality of semiconductor optical amplifiers 602a-602d is coupled by a respective lens 604a-604b to send the amplified signals back to the integrated circuit 606. Although not shown, the semiconductor chip 606 also includes other inputs and outputs for providing the optical signal to other components. In some implementations, optical ports on each two chips that are aligned must be on the same pitch, also need to have matching optical mode sizes and facet angle according to the Snell law.

Figure 7:
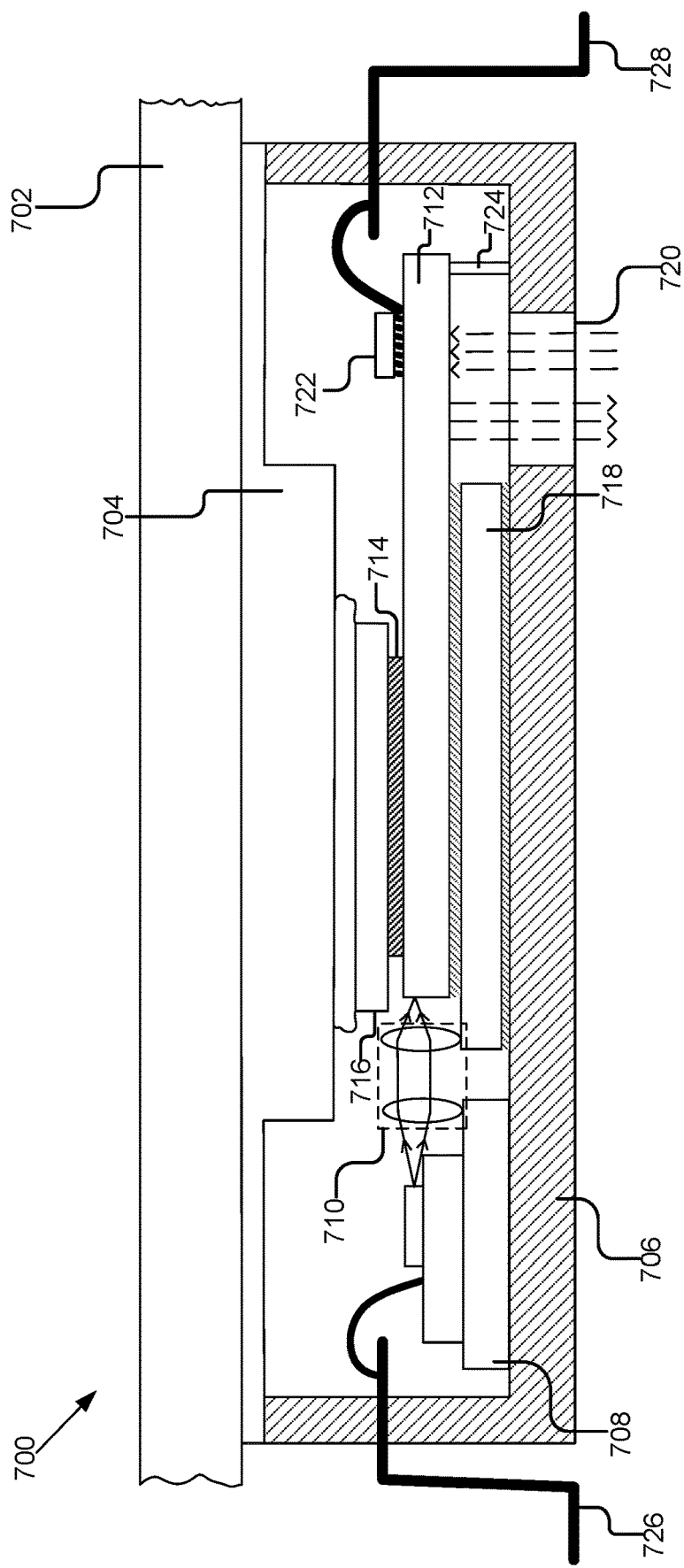
FIG. 7 is a cross-sectional diagram illustrating an example integrated chip packaging of a modular LIDAR system for autonomous vehicles, according to some implementations.

FIG. 7 shows a cross-sectional diagram illustrating an example integrated chip packaging 700 of a modular LIDAR system for an autonomous vehicle, according to some implementations. In FIG. 7, the integrated chip packaging 700 for the LIDAR system defines a configuration of optical components that provide a path for the light signal or beam to travel in and out of the integrated chip packaging 700 and dissipate the heat generated by the optical components for improved performance. The integrated chip packaging 700 may include a lid 704 covering the top side of the integrated chip packaging 700. The integrated chip packaging 700 may include a U-shaped block 706 coupled to the lid 704, thereby enclosing the optical components in a hermetic seal. For example, the U-shaped block 706 may be made of copper. The integrated chip packaging 700 may include a cold plate 702 coupled to a side of the integrated chip packaging 700. In some implementations, the cold plate 702 may be coupled to the lid 704 to be on top of the lid 704. In other implementations, the cold plate 702 may be coupled to the U-shaped block 706 to be below the U-shaped block 706 opposite the lid 704 in such a way as to not obstruct the optical window 420. The material of the cold plate 702 may be from one of copper, aluminum, and silicon.

The integrated chip packaging 700 may include a silicon photonics transceiver chip 712 that is separate from the MOB 708. The transceiver chip 712 is coupled to the MOB 708 via the micro-optics assembly 710 and configured to receive the beam output by the MOB 708. For example, the micro-optics assembly 710 may include a micro-lens array for collimating the beam from the MOB 708 into a coupling facet on the edge of the transceiver chip 712. The integrated chip packaging 700 may include an assembly of semiconductor optical amplifier (SOA) array chips 714. A SOA array chip 714 may be implemented as III-V semiconductor module coupled to the transceiver chip 412 by hybrid integration on a top surface of the transceiver chip 712. This hybrid integration is beneficial as it removes the need for micro-optics assembly to couple the SOA array chip 714 with the transceiver chip 712. The transceiver chip 412 is configured to process the beam received from the MOB 708. For example, the transceiver chip 712 amplifies the beam using one or more SOA array chips 714.

The integrated chip packaging 700 may include an optical window 720 in the U-shaped block 706 on the bottom side opposite to the lid 704 to provide an interface for optical signals. The material of the optical window 720 may be one of glass, fused silica, and organic polymer. The optical window 720 allows the beam to travel in and out of the surface-emitting transceiver chip 712. After amplifying the beam using the assembly of SOA array chips 714 on the top surface, the transceiver chip 712 is configured to emit the beam perpendicularly from the bottom surface through the optical window 720. For example, the beam is emitted out of the integrated chip packaging 700 at a right angle to the bottom surface of the transceiver chip 712. An advantage of the surface emission of beam from the transceiver chip 712 is that the configuration of the optical window 720 is easy compared to edge emission from the transceiver chip 712. If the beam were to be emitted from the edge of the transceiver chip 712, the optical window 720 may need accurate alignment where the optical window 720 is made to be flush with the narrow edge of the transceiver chip 712. As such, the surface emission feature of the transceiver chip 712 lends to easy assembly and manufacturability of the integrated chip packaging 700. The transceiver chip 712 may be configured to extend laterally over the optical window 720 by a threshold offset to sufficiently overlap the optical window 720 within the integrated chip packaging 700. The end of the transceiver chip 712 extending laterally over the optical window 720 may be coupled to a supporting structure 724 for mechanical strength. In one example, the dimensions of the optical window may be length millimeters x width millimeters. The distance between the bottom surface of the transceiver chip 712 and the optical window 720 may be about X microns.

The beam emitted from the integrated chip packaging 700 may hit a target and get reflected back into the integrated chip packaging 700 through the same optical window 720. The transceiver chip 712 is configured to receive and process the reflected beam from the target. For example, the transceiver chip 712 may configure a photodiode to generate a photocurrent based on the reflected beam collected through the optical window 720 and send the resulting photocurrent to a transimpedance amplifier (TIA) 722. In some implementations, the integrated chip packaging 700 may include the TIA 722 integrated with the transceiver chip 712 using flip-chip bonding. The TIA 722 may be configured to convert the photocurrent into a voltage signal which is then coupled out of the integrated chip packaging 700 through the wire bond 728. In some implementations, the integrated chip packaging 700 may include the TIA 722 on a surface of a chip carrier off the transceiver chip 712 and couple it to the transceiver chip 712. In other implementations, the integrated chip packaging 700 excludes the TIA 722 from the packaged integration. For example, the TIA 722 is located outside of the integrated chip packaging 700.

In some implementations, the integrated chip packaging 700 may include a configuration of double-sided heat transfer assembly for dissipating heat generated by the enclosed components during operation and maintaining the temperature of the enclosed components at or below the reference temperature of the cold plate 702. In a double-sided heat transfer assembly, a first heat transfer component 718 may be coupled to the bottom surface of the transceiver chip 712 such that it is placed between the transceiver chip 712 and the metal base of the U-shaped block 706 for heat dissipation. A second heat transfer component 716 may be coupled to the exposed, top surface of SOA array chip 714 such that it is placed between the SOA array chip 714 and the lid 704 of the integrated chip packaging 700 for heat dissipation. For example, the heat transfer component may be a thermal interface material (e.g., aluminum nitride (AlN) ceramic, beryllium oxide ceramic, pyrolytic graphite sheet (PGS), etc.), a thermoelectric cooler (TEC), a liquid cooling system, or combinations thereof. In the example of FIG. 7, the first heat transfer component 718 may be a thermoelectric cooler or aluminum nitride ceramic. The second heat transfer component 716 may include a first layer of thermal interface material, such as an AlN-n-clamp coupled to the exposed surface of SOA array chip 714 and a second layer of thermal interface material, such as PGS coupled to the top of the first layer. Any suitable height of the second heat transfer component 718 can be used. The second heat transfer component 718 reduces the divergence of light emitting from the bottom surface of the transceiver chip 712 through the optical window 720. The combination of a small optical window 720 and a thin height of the second heat transfer component 718 results in a large area under the transceiver chip 712 to be covered by the second heat transfer component 718 for effective heat dissipation.

The foregoing detailed description of the present disclosure has been presented for purposes of illustration and description. The above description is not intended to be exhaustive or to limit the present disclosure to the precise form disclosed. Many modifications and variations are possible in light of the above teachings. The described implementations were chosen in order to best explain the principles of the present disclosure and its practical application, to thereby enable others skilled in the art to best utilize the present disclosure in various implementations and with various modifications as are suited to the particular use contemplated. It is intended that the scope of the present disclosure be defined by the claims appended hereto.

Although some implementations of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present disclosure is not intended to be limited to the particular implementations of the process, machine, fabrication, composition of matter, means, methods, and steps described in the specification. As one of ordinary skill in the art will readily appreciate from the description of the present disclosure, processes, machines, fabrication, compositions of matter, means, methods, or steps, presently existing or later to be developed, that perform substantially the same function or achieve substantially the same result as the corresponding implementations described herein may be utilized according to the present disclosure. Accordingly, the appended claims are intended to include within their scope such processes, machines, fabrication, compositions of matter, means, methods, or steps.

What is claimed is:

1. A light detection and ranging (LIDAR) system comprising:
   a seed laser configured to output a beam;
   a modular modulator configured to receive the beam output from the seed laser and modulate the beam to create a modulated beam;
   a modular amplifier configured to receive the modulated beam from the modular modulator and generate an amplified beam, wherein the modular amplifier comprises a particular semiconductor optical amplifier having multiple apertures; and
   a modular transceiver chip coupled to the modular modulator and the modular amplifier, the modular transceiver chip configured to emit the beam perpendicularly from a first surface of the modular transceiver chip through an optical window and receive a reflected beam from a target through the optical window.

2. The LIDAR system of claim 1, wherein the seed laser comprises a laser having a grating structure that provides optical feedback to output the beam.

3. The LIDAR system of claim 2, wherein the seed laser comprises a lens coupling the beam to the modular modulator, the lens having a pitch in a range of 450 to 550 micrometers.

4. The LIDAR system of claim 1, wherein the modular modulator performs in-phase and quadrature modulation to generate the modulated beam.

5. The LIDAR system of claim 1, wherein the modular modulator performs frequency modulation to generate the modulated beam.

6. The LIDAR system of claim 1, wherein the modular modulator and the seed laser are integrated into a single chip.

7. The LIDAR system of claim 6, wherein the seed laser is mounted on a first submount and the modular transceiver chip coupled to the modular modulator is mounted on a second submount for aligning a height of the seed laser and a height of the modular transceiver chip for optical coupling.

8. The LIDAR system of claim 1, wherein the modular amplifier comprises a semiconductor optical amplifier.

9. The LIDAR system of claim 1, wherein the modular amplifier comprises a tapered semiconductor optical amplifier that is configured to receive the modulated beam from the modular modulator and generate the amplified beam through stimulated emission.

10. The LIDAR system of claim 1, wherein the modular amplifier includes one of indium phosphide (InP), gallium arsenide (GaAs), indium monoarsenide (InAs), gallium and nitride (GaN), indium antimonide (InSb), or rare-earth doped material.

11. The LIDAR system of claim 1, wherein the particular semiconductor optical amplifier has additional material on its sides for bow management.

12. The LIDAR system of claim 1, wherein the modular amplifier comprises a first bar mounted on a first portion of the modular amplifier and a second bar mounted on a second portion of the modular amplifier, the second bar having a coefficient of thermal expansion matching that of the first bar, the first bar and the second bar configured to lower a junction temperature of the modular amplifier.

13. The LIDAR system of claim 1, wherein the modular modulator is optically coupled to the modular amplifier by a lens array.

14. The LIDAR system of claim 13, wherein the lens array compensates for a height difference in a first height of a submount of the modular modulator and a second height of a submount of the modular amplifier.

15. The LIDAR system of claim 1, further comprising a splitter that couples the modular modulator to the modular amplifier, wherein the splitter includes a 1-to-16 splitter with a pitch in a range of 450 to 550 micrometers.

16. The LIDAR system of claim 1, further comprising a lens array that couples the modular modulator to the modular amplifier, and a splitter that includes a plurality of 1-to-4 splitter chips with a pitch in a range of 450 to 550 micrometers, and wherein the lens array includes four lenses and have a pitch in a range of 450 to 550 micrometers.

17. The LIDAR system of claim 1, wherein the modular modulator, the modular amplifier and the modular transceiver chip are horizontally integrated.

18. The LIDAR system of claim 1, wherein the modular modulator, the modular amplifier and the modular transceiver chip are vertically integrated.

19. The LIDAR system of claim 1, wherein the modular modulator, the modular amplifier and the modular transceiver chip are part of an autonomous vehicle.

20. The LIDAR system of claim 1, wherein the modular modulator, the modular amplifier and the modular transceiver chip are part of an autonomous vehicle control system.

* * * * *